(12) United States Patent
Ranalli et al.

(10) Patent No.: US 9,002,138 B2
(45) Date of Patent: Apr. 7, 2015

(54) COMPUTATIONAL IMAGING USING VARIABLE OPTICAL TRANSFER FUNCTION

(71) Applicant: Ziva Corporation, San Diego, CA (US)

(72) Inventors: Eliseo Ranalli, Irvine, CA (US); Robert Saperstein, La Jolla, CA (US)

(73) Assignee: Ziva Corporation, San Diego, CA (US)

( * ) Notice: Subject to any disclaimer, the term of this patent is extended or adjusted under 35 U.S.C. 154(b) by 51 days.

(21) Appl. No.: 13/731,067

(22) Filed: Dec. 30, 2012

(65) Prior Publication Data

US 2013/0329094 A1 Dec. 12, 2013

Related U.S. Application Data

(63) Continuation-in-part of application No. 13/385,603, filed on Jun. 11, 2012, now abandoned.

(60) Provisional application No. 61/577,336, filed on Dec. 19, 2011.

(51) Int. Cl.

| G06K 9/36 | (2006.01) |
|---|---|
| G06K 9/46 | (2006.01) |
| H04N 5/265 | (2006.01) |
| G06T 5/00 | (2006.01) |
| G06T 5/10 | (2006.01) |
| G06T 5/20 | (2006.01) |
| G06T 5/50 | (2006.01) |
| H04N 5/217 | (2011.01) |
| H04N 5/232 | (2006.01) |
| H04N 5/238 | (2006.01) |

(52) U.S. Cl.
CPC ............... *H04N 5/265* (2013.01); *G06T 5/003* (2013.01); *G06T 5/10* (2013.01); *G06T 5/20* (2013.01); *G06T 5/50* (2013.01); *G06T 2207/20056* (2013.01); *H04N 5/217* (2013.01); *H04N 5/23232* (2013.01); *H04N 5/238* (2013.01)

(58) Field of Classification Search
None
See application file for complete search history.

(56) References Cited

U.S. PATENT DOCUMENTS

| 4,084,153 | A | * | 4/1978 | Otten ............................ 365/125 |
|---|---|---|---|---|
| 4,111,519 | A | * | 9/1978 | Gillis et al. ....................... 359/9 |
| 4,136,954 | A | * | 1/1979 | Jamieson ...................... 356/456 |
| 5,155,558 | A | * | 10/1992 | Tannenbaum et al. ........ 356/446 |
| 5,237,367 | A | * | 8/1993 | Kudo .............................. 355/67 |
| 5,563,864 | A | * | 10/1996 | Kobayashi et al. ......... 369/59.22 |
| 5,930,012 | A | * | 7/1999 | Mears et al. .................... 359/15 |

(Continued)

OTHER PUBLICATIONS

Yaroslavsky et al., "Deconvolution of multiple images of the same object," Applied Optics, vol. 33, p. 2157 (1994).*

(Continued)

*Primary Examiner* — Bhavesh Mehta
*Assistant Examiner* — Feng Niu
(74) *Attorney, Agent, or Firm* — Anatoly S. Weiser, Esq.; Acuity Law Group

(57) ABSTRACT

In selected embodiments, improved image restoration is realized using extensions of Wiener filtering combined with multiple image captures acquired after simple, fast reconfigurations of an optical imaging system. These reconfigurations may yield distinct OTF responses for each capture. The optical imaging system may reduce fabrication cost, power consumption, and/or system weight/volume by correcting significant optical aberrations. The system may be configured to perform independent correction of fields within the total field-of-regard. The system may also be configured to perform independent correction of different spectral bands.

27 Claims, 8 Drawing Sheets

(56) References Cited

U.S. PATENT DOCUMENTS

| | | | |
|---|---|---|---|
| 6,369,954 B1* | 4/2002 | Berge et al. | 359/666 |
| 6,470,097 B1* | 10/2002 | Lai et al. | 382/255 |
| 6,665,127 B2* | 12/2003 | Bao et al. | 359/665 |
| 7,098,517 B2* | 8/2006 | Matsuo | 257/415 |
| 7,298,916 B2* | 11/2007 | Miyamoto | 382/254 |
| 7,485,869 B2* | 2/2009 | Harrison et al. | 250/372 |
| 7,535,501 B1* | 5/2009 | Loushin et al. | 348/246 |
| 7,630,148 B1* | 12/2009 | Yang et al. | 359/740 |
| 7,693,324 B2* | 4/2010 | Brasen et al. | 382/149 |
| 7,948,550 B2 | 5/2011 | Robinson et al. | |
| 8,085,452 B2* | 12/2011 | Stanley | 359/9 |
| 8,154,636 B2* | 4/2012 | Rappaport et al. | 348/294 |
| 2002/0054210 A1* | 5/2002 | Glier et al. | 348/149 |
| 2002/0057506 A1* | 5/2002 | Kaneko | 359/846 |
| 2002/0167603 A1* | 11/2002 | Kato et al. | 348/341 |
| 2003/0124611 A1* | 7/2003 | Schwartz | 435/6 |
| 2003/0132902 A1* | 7/2003 | Miyamoto | 345/87 |
| 2005/0041278 A1* | 2/2005 | Matsuo | 359/290 |
| 2005/0055727 A1* | 3/2005 | Creamer et al. | 725/105 |
| 2006/0249801 A1* | 11/2006 | Matsuo | 257/415 |
| 2007/0009148 A1* | 1/2007 | Brasen et al. | 382/149 |
| 2008/0100707 A1* | 5/2008 | Brown | 348/158 |
| 2008/0212159 A1* | 9/2008 | Giles et al. | 359/238 |
| 2008/0278780 A1* | 11/2008 | Stanley | 359/9 |
| 2009/0128666 A1* | 5/2009 | Rappaport et al. | 348/241 |
| 2009/0251666 A1* | 10/2009 | Lindacher et al. | 351/233 |
| 2009/0262363 A1* | 10/2009 | Keshavmurthy et al. | 356/511 |
| 2009/0310229 A1* | 12/2009 | Yang et al. | 359/694 |
| 2009/0315991 A1* | 12/2009 | Renkis | 348/143 |
| 2010/0081901 A1* | 4/2010 | Buice et al. | 600/324 |
| 2010/0220188 A1* | 9/2010 | Renkis | 348/143 |
| 2010/0328461 A1* | 12/2010 | Renkis | 348/143 |
| 2010/0328505 A1* | 12/2010 | Imamura | 348/273 |
| 2011/0043806 A1* | 2/2011 | Guetta et al. | 356/432 |
| 2012/0062733 A1* | 3/2012 | Mironichev et al. | 348/143 |
| 2012/0301129 A1* | 11/2012 | Smith | 396/427 |

OTHER PUBLICATIONS

Stewart et al., "Design and development of a 331-segment tip-tilt-piston mirror array for space-based adaptive optics," Sensors and Actuators a-Physical, [138], 230-238, (2007).*

AOptix Technologies Introduces AO-Based FSO Communications Product, www.adaptiveoptics.org, Jun. 2005, as retrieved Jun. 13, 2014 (1 page).

Beckers, Adaptive Optics for Astronomy: Principles, Performance, and Applications, Annu. Reo. Astron. Astrophys., 1993, 13-62, vol. 31, Iss. 1.

Brady et al., Multiscale Lens Design, Optics Express, 2009, 10659-10674, vol. 17, Iss. 13.

Cossairt et al., Diffusion Coding Photography for Extended Depth of Field, ACM Transactions on Graphics (TOG)—Proc. SIGGRAPH, 2010, Article No. 31, vol. 29, Iss. 4 (10 pages).

Dowski et al., Extended depth of field through wave-front coding, App. Opt., 1995, 1859-1866, vol. 34, No. 11.

Gonzalez et al., Image Restoration, in Gonzalez et al (eds.), Digital Image Processing 2nd Ed., 2002, 253-303, Ch. 5.

Graal on a Quest to Improve HAWK-I's Vision, ESO Picture of the Week as retrieved Jun. 13, 2014 (2 pages).

Harikumar et al., Exact Image Deconvolution from Multiple FIR Blurs, IEEE Trans. Image Process., 1999, 846-862, vol. 8 No. 6.

Hausler, A method to increase the depth of focus by two step image processing, Optical Communications, 1972, 38-42, vol. 6, No. 1.

Max, Introduction to Adaptive Optics and its History, American Astronomical Society 197th Meeting (7 pages).

PixelOptics to Develop SuperVision for U.S. Military; $3.5 Million in Funding Provided ASDNews, ASDNews, as retrieved Jun. 13, 2014 (2 pages).

Retinal OCT Imaging System to Incorporate Adaptive Optics, www.adaptiveoptics.org, Apr. 10, 2006, as retrieved Jun. 13, 2014 (1 page).

Roorda et al., Retinal imaging using adaptive optics, in Macrae et al. (eds.), Customized Corneal Ablation: The Quest for SuperVision, 2001, 11-32, Ch. 2, SLACK, Inc.

Watson, Tip-Tilt Correction for Astronomical Telescopes using Adaptive Control, Wescon/97. Conference Proceedings, 1997, 490-497.

* cited by examiner

COMPUTATIONAL IMAGING USING VARIABLE OPTICAL TRANSFER FUNCTION

CROSS-REFERENCE TO RELATED APPLICATIONS

The present application claims priority from U.S. patent application Ser. No. 13/385,603, entitled COMPUTATIONAL IMAGING USING VARIABLE OPTICAL TRANSFER FUNCTION, filed on 11 Jun. 2012, which is hereby incorporated by reference in its entirety as if fully set forth herein, including text, figures, claims, tables, and computer program listing appendices (if present), and all other matter in the patent application. U.S. patent application Ser. No. 13/385,603 claims priority from U.S. Provisional Patent Application Ser. No. 61/577,336. entitled COMPUTATIONAL IMAGING USING A CONFIGURABLE OPTICAL COMPONENT, filed on 19 Dec. 2011.

FIELD

This document is related to the field of imaging and image processing, and particularly to computational picture reconstruction or enhancement based on a series of detected images.

BACKGROUND

Traditionally, the "speed" of an optical design is dictated by the aberrations that can be tolerated for a given complexity of the design. Aberrations reduce the image forming capacity of optical systems. An optical design may avoid or reduce aberrations by sacrificing size, cost, light collection, and possibly other performance criteria.

Computational imaging ("CI") techniques may be used to circumvent the traditional design limitations through aberration compensation performed in signal post-processing. To restore image quality, CI techniques may exploit knowledge of the optical transfer function ("OTF") of the design, to create filters that compensate for the known aberrations in the design.

Wiener filtering may use the known optical transfer function and noise statistics to produce a linear transfer function that, when multiplied by the OTF, reduces the error in the resulting product. While it may be optimal in the sense of producing the least square error ("LSE"), Wiener filtering and other techniques are fundamentally limited in their correction ability by the optical information lost in the imaging system (i.e., the optical information lost between the imaged object and a corrupted image of the object formed by the system on the image capturing element of the system, such as image sensor). While the magnitude of the optical transfer function ("MTF") approaches zero at the cutoff spatial frequency, the loss of additional information (i.e., the presence of MTF zeros or greatly reduced values, such as values reduced by 10 dB, 20 dB, or 30 dB below peak of the MTF) at much lower spatial frequencies is associated with aberrations. Thus, imaging techniques are limited by the presence in the OTF of zeroes or relatively low values, such as values below a detectable limit.

SUMMARY

Needs in the art exist for lower complexity, lower costs, lower weight, and/or smaller size and form-factor imagers than those associated with the known imaging techniques. A need in the art also exists to enable increased degrees of freedom in optical design, which techniques may allow more light to be collected and detected. Another need in the art is to provide field-dependent compensation in optical imagers. Still another need in the art is to provide spectral compensation in optical imagers.

It is therefore desirable to provide wide field-of-view, single- and multi-spectral imaging methods and systems that have lower costs, lower size, lower weight, and/or lower power consumption, without significant loss of performance.

It is also desirable to modify optical imaging systems in such a way as to preserve the MTF at sufficient level with respect to signal-to-noise ratio ("SNR") for spatial frequencies of interest, even in the presence of aberrations. Additionally, to support applications requiring high-resolution, wide-field-of-view ("WFOV") and/or multispectral imaging, it is desirable to have independent compensation of image features (1) at any or all locations within the field-of-regard, and (2) in the spectral bands of interest.

Embodiments described throughout this document include optical designs that provide a (re)constructed picture from a series of detected images. The detected images may be obtained using substantially the same optical hardware for each exposure, perturbed by a configurable optical component, for example. In variants, the optical design is reconfigured by a parameter adjustment of a single- or multi-parameter deformable mirror (DM); lens focus adjustment; focal plane position adjustment; aperture size adjustment; and liquid lens dioptric adjustment. If the aberrations are field-dependent, camera angle sweeping, panning, zooming, and/or other techniques for creating perceived motion of the imaged object relative to the focal image plane may also provide unique OTF's for a series of image captures.

Each of the plurality of different optical arrangements may correspond to a different configuration of the optical hardware, for example, a different perturbation of the deformable mirror (or other configurable optical component). Each of the different optical arrangements may yield a known optical transfer function. In variants, the different optical arrangements (or some of them) do not share the precise locations of the OTF zeroes.

An enhanced image may be (re)constructed from the multiple images, using post-processing algorithms. Correction of aberrations may be made field-dependent and/or spectrum-dependent. In embodiments, the post-processing CI algorithmic methods may allow the user to enjoy (1) high resolution, wide field-of-view imaging with field-specific compensation by making use of OTF information over all fields, and/or (2) high resolution multispectral imaging with spectrally dependent compensation making use of OTF information at different spectral bands of interest.

Selected embodiments in accordance with this document have the potential to advance significantly the state-of-the art in light, small-form-factor imagers that are optically fast and natively far from being diffraction-limited. This potential is particularly attractive for night vision systems.

Some of the embodiments in accordance with this document do not attempt to correct the OTF per se, but simply rely on the configurable component to shuffle the positions of the OTF's zeroes. As a result, the configurable component (e.g., a deformable mirror) may be less complex than that required for the general task of OTF correction. In some embodiments, however, the configurable optical component may be used for both (1) shuffling the positions of the zeroes, and (2) correcting the OTF.

Some of the embodiments in accordance with this document include least-square-error solutions that represent a sequential extension of the Wiener filter algorithm. One is the moving-average approach, in which a plurality of M detected images is used for each reconstruction. Another is a recursive approach, in which the reconstruction is continually updated with newly-detected image(s).

Selected embodiments provide specific, practical hardware systems and methods to realize a sequence of unique OTFs in a single optical imager, and provide signal processing methods that extend CI to correct for aberrations in any or all field locations and in any or all spectral bands of interest.

Selected embodiments in accordance with this document have the potential to advance significantly the state-of-the art in light, small-form-factor imagers that are optically fast and natively far from being diffraction-limited. This potential is particularly attractive for night vision systems.

Some of the embodiments in accordance with this document do not attempt to correct the OTF per se, but simply rely on the configurable component to shuffle the positions of the OTF's zeroes. As a result, the configurable component (e.g., a deformable mirror) may be less complex than that required for the general task of OTF correction. In some embodiments, however, the configurable optical component may be used for both (1) shuffling the positions of the zeroes, and (2) correcting the OTF.

Some of the embodiments in accordance with this document include least-square-error solutions that represent a sequential extension of the Wiener filter algorithm. One is the moving-average approach, in which a plurality of M detected images is used for each reconstruction. Another is a recursive approach, in which the reconstruction is continually updated with newly-detected image(s).

Selected embodiments provide specific, practical hardware systems and methods to realize a sequence of unique OTFs in a single optical imager, and provide signal processing methods that extend CI to correct for aberrations in any or all field locations and in any or all spectral bands of interest.

In an embodiment, an imaging method includes capturing a plurality of M captured images of an object through an optical system, the optical system comprising a configurable optical component, the configurable optical component being capable of being configured in a plurality of configurations, wherein each captured image of the plurality of images is captured with the configurable optical component being in a different corresponding configuration of the plurality of configurations; transforming each of the captured images using a selected spatial transform to obtain a corresponding transformed captured image, thereby obtaining a plurality of M transformed captured images; weighting each of the transformed captured images by a weighting coefficient $A_m$ computed using the formula $$A_m = \frac{R_m^*}{\frac{S_{noise}}{S_{obj}} + \sum_{m=1}^{M} |R_m|^2},$$

wherein $R_m$ is the optical transfer function of the optical system in configuration corresponding to the captured image from which said each of the transformed captured images was obtained, $R_m^*$ is the complex conjugate of $R_m$, $S_{Noise}$ is the average power spectral density of the noise projection of the object, and $S_{Obj}$ is the average power spectral density of the noise-free projection of the object, resulting in a weighted image corresponding to said transformed captured image, thereby obtaining a plurality of M weighted images; summing the weighted images of the plurality of M weighted images to obtain a summed transformed image; inverse transforming the summed transformed image using inverse transform of the selected spatial transform to obtain a processed image; and outputting the processed image, the step of outputting comprising storing the processed image, displaying the processed image, or transmitting the processed image.

In an embodiment, an imaging method includes capturing a plurality of M captured images of an object through an optical system, the optical system comprising a configurable optical component, the configurable optical component being capable of being configured in a plurality of configurations, wherein each captured image of the plurality of images is captured with the configurable optical component being in a different corresponding configuration of the plurality of configurations; transforming each of the captured images using a selected spatial transform to obtain a corresponding transformed captured image, thereby obtaining a plurality of M transformed captured images; weighting each of the transformed captured images by a weighting coefficient $(1-\eta) \times B_m$ wherein $\eta$ is a predetermined constant less than 1 and greater than 0, and $B_m$ is computed using the formula $$B_m = \frac{R_m^*}{\frac{S_{noise}}{S_{obj}} + |R_m|^2},$$

wherein $R_m$ is the optical transfer function of the optical system in configuration corresponding to the captured image from which said each of the transformed captured images was obtained, $R_m^*$ is the complex conjugate of $R_m$, $S_{Noise}$ is the average power spectral density of the noise projection of the object, and $S_{Obj}$ is the average power spectral density of the noise-free projection of the object, thereby obtaining a weighted image corresponding to said transformed captured image, thereby obtaining a plurality of M weighted images; initializing a summed transformed image; after the step of initializing, in response to obtaining each weighted image of the plurality of M weighted images, modifying the summed transformed image by first multiplying the summed transformed image by $\eta$ and then adding to the summed transformed image said each weighted image; inverse transforming the summed transformed image using inverse transform of the selected spatial transform to obtain a processed image; and outputting the processed image, the step of outputting comprising storing the processed image, displaying the processed image, or transmitting the processed image.

In an embodiment, an apparatus for processing images includes an optical system comprising a configurable component, the configurable optical component being capable of being configured in a plurality of different configurations; and at least one processor, wherein the at least one processor is coupled to the optical system to enable the at least one processor to control configuration of the configurable component and to capture images in a focal plane of the optical system. The at least one processor is configured to execute program code instructions to cause the apparatus to capture a plurality of M captured images of an object through the optical system, wherein each captured image of the plurality of images is captured with the configurable optical component being in a different corresponding configuration of the plurality of configurations; transform each of the captured images using a selected spatial transform to obtain a corresponding transformed captured image, thereby obtaining a plurality of M transformed captured images; weight each of the transformed captured images by a weighting coefficient $A_m$ computed using the formula $$A_m = \frac{R_m^*}{\frac{S_{noise}}{S_{obj}} + \sum_{m=1}^{M} |R_m|^2},$$

wherein $R_m$ is the optical transfer function of the optical system in configuration corresponding to the captured image from which said each of the transformed captured images was obtained, $R_m^*$ is the complex conjugate of $R_m$, $S_{Noise}$ is the average power spectral density of the noise projection of the object, and $S_{Obj}$ is the average power spectral density of the noise-free projection of the object, resulting in a weighted image corresponding to said transformed captured image, thereby obtaining a plurality of M weighted images; sum the weighted images of the plurality of M weighted images to obtain a summed transformed image; inverse transform the summed transformed image using inverse transform of the selected spatial transform to obtain a processed image; and output the processed image, the step of outputting comprising storing the processed image, displaying the processed image, or transmitting the processed image.

In an embodiment, an apparatus for processing images includes an optical system comprising a configurable component, the configurable optical component being capable of being configured in a plurality of different configurations; and at least one processor, wherein the at least one processor is coupled to the optical system to enable the at least one processor to control configuration of the configurable component and to capture images in a focal plane of the optical system. The at least one processor is configured to execute program code instructions to cause the apparatus to capture a plurality of M captured images of an object through an optical system, wherein each captured image of the plurality of images is captured with the configurable optical component being in a different corresponding configuration of the plurality of configurations; transform each of the captured images using a selected spatial transform to obtain a corresponding transformed captured image, thereby obtaining a plurality of M transformed captured images; weight each of the transformed captured images by a weighting coefficient $(1-\eta) \times B_m$ wherein $\eta$ is a predetermined constant less than 1 and greater than 0, and $B_m$ is computed using the formula $$B_m = \frac{R_m^*}{\frac{S_{noise}}{S_{obj}} + |R_m|^2},$$

wherein $R_m$ is the optical transfer function of the optical system in configuration corresponding to the captured image from which said each of the transformed captured images was obtained, $R_m^*$ is the complex conjugate of $R_m$, $S_{Noise}$ is the average power spectral density of the noise projection of the object, and $S_{Obj}$ is the average power spectral density of the noise-free projection of the object, thereby obtaining a weighted image corresponding to said transformed captured image, thereby obtaining a plurality of M weighted images; initialize a summed transformed image; after the step of initializing, in response to obtaining each weighted image of the plurality of M weighted images, modify the summed transformed image by first multiplying the summed transformed image by $\eta$ and then adding to the summed transformed image said each weighted image; inverse transforming the summed transformed image using inverse transform of the selected spatial transform to obtain a processed image; and output the processed image, the step of outputting comprising storing the processed image, displaying the processed image, or transmitting the processed image.

In an embodiment, an imaging method includes capturing a plurality of M captured images of an object in a scene through an optical system, the optical system being configurable in a plurality of configurations, each configuration of the plurality of configurations corresponding to a different optical transfer function between the object and an image sensor of the optical system, wherein each captured image of the plurality of images is captured with a distinct optical transfer function between the object and the image sensor; applying extended Wiener filtering to each of the captured images to obtain a corresponding filtered image, thereby obtaining a plurality of M filtered images; and combining computationally the plurality of M filtered images to obtain an enhanced image.

In an embodiment, an imaging apparatus includes an optical system comprising an image sensor, the optical system being configurable in a plurality of configurations, each configuration of the plurality of configurations corresponding to a different optical transfer function between an object in a scene and the image sensor of the optical system; and at least one processor, wherein the at least one processor is coupled to the optical system to enable the at least one processor to control configuration of the optical system and to capture images in a focal plane of the optical system. The at least one processor is configured to execute program code instructions to cause the apparatus to capture a plurality of M captured images of the object, wherein each captured image of the plurality of images is captured with a distinct optical transfer function between the object and the image sensor, apply extended Wiener filtering to each of the captured images to obtain a corresponding filtered image, thereby obtaining a plurality of M filtered images, and combine computationally the plurality of M weighted images to obtain an enhanced image.

These and other features and aspects of selected embodiments not inconsistent with the present invention will be better understood with reference to the following description, drawings, and appended claims.

DETAILED DESCRIPTION

Figure 1:
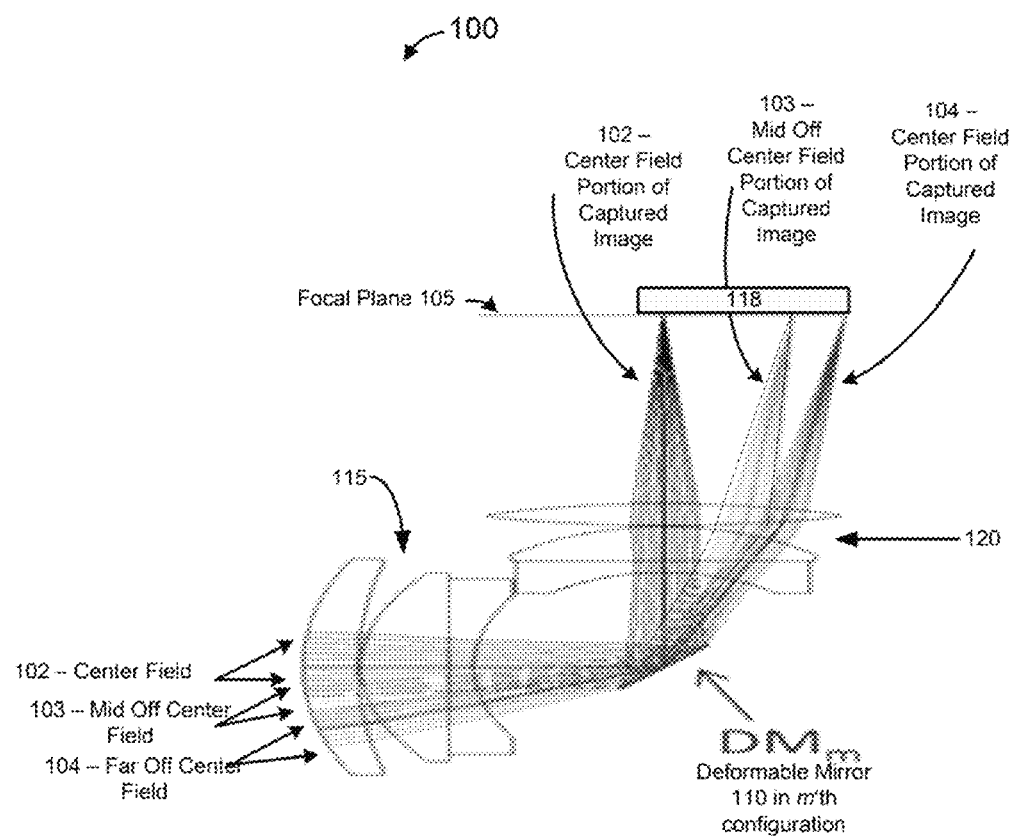
FIG. 1 illustrates selected components of an imaging optical system with a configurable component.

In this document, the words "embodiment," "variant," "example," and similar words and expressions refer to a particular apparatus, process, or article of manufacture, and not necessarily to the same apparatus, process, or article of manufacture. Thus, "one embodiment" (or a similar expression) used in one place or context may refer to a particular apparatus, process, or article of manufacture; the same or a similar expression in a different place or context may refer to a different apparatus, process, or article of manufacture. The expression "alternative embodiment" and similar words and expressions are used to indicate one of a number of different possible embodiments, variants, or examples. The number of possible embodiments, variants, or examples is not necessarily limited to two or any other quantity. Characterization of an item as "exemplary" means that the item is used as an example. Such characterization does not necessarily mean that the embodiment, variant, or example is preferred; the embodiment, variant, or example may but need not be a currently preferred embodiment, variant, or example. All embodiments, variants, and examples are described for illustration purposes and are not necessarily strictly limiting.

The words "couple," "connect," and similar expressions with their inflectional morphemes do not necessarily import an immediate or direct connection, but include within their meaning both direct/immediate connections and connections through mediate elements.

The expression "processing logic" should be understood as selected steps and decision blocks and/or hardware for implementing the selected steps and decision blocks. "Decision block" means a step in which a decision is made based on some condition, and process flow may be altered based on whether the condition is met or not met.

A "field position" or simply a "field" is the specific direction of incidence of the rays received by optics (e.g., a frontend optic) from a scene. Field position may vary in (be a function of) a single dimension. In spherically symmetrical optics, for example, a field position may correspond to a specific angle of incidence. More generally, field position may vary in two dimensions. Thus, a scan of a scene involves image captures over field positions that may together cover the scene. The concept of field position is well understood in the imaging art.

"Field-of-Regard" is the three-dimensional angular range over which an optical system can image, although not necessarily all at once. In other words, it is the sum total of all "fields" over which the system can image, though not necessarily all at once. The concept of field-of-regard is well understood in the image processing art.

"Optical" means related to visible, infrared, and/or ultraviolet portion(s) of the electromagnetic spectrum.

When "top," "bottom," "left," "right" and analogous directional indicators are used for describing the embodiments in the Figures, they are intended to facilitate the description and not as substantive requirements.

When the word "selected" is used with reference to an item (such as a component, embodiment, variant, element, step) and without mention of the specific selection process, the word signifies any one or more, possibly but not necessarily all, of the items available for the purpose described. For example, "selected components of the system include" is used in the sense that other components may be found in the referenced system, and some of the described components may be omitted in some other systems.

Other and further explicit and implicit definitions and clarifications of definitions may be found throughout this document.

Reference will be made in detail to one or more embodiments (apparatus, methods, and/or articles of manufacture) that are illustrated in the accompanying drawings. Same reference numerals may be used in the drawings and this description to refer to the same apparatus elements and method steps. The drawings may be in a simplified form, not to scale, and may omit apparatus elements and method steps that can be added to the described systems and methods, while possibly including optional elements and/or steps.

FIG. 1 illustrates selected components of an imaging optical system 100 with a configurable component. Here, the configurable component can be a deformable mirror ("DM") 110 at the physical stop of the system 100. The deformable mirror can be configured to a plurality of M different states $DM_m$, m=1 . . . M, as shown in FIG. 1. Commercially available examples of micro-electromechanical system ("MEMS") based general purpose DMs are provided by Thorlabs, 435 Route 206, North Newton, NJ 07860; tel. 973-579-7227. Such mirrors are generally intended to take out aberrations such as *defocus*, *astigmatism*, spherical *aberration*, and *coma*, often requiring multiple control *parameters*. In selected embodiments described in this *document*, only a single variable control parameter of the configurable optical component is *used*, whether or not the DM can be controlled with a single control *parameter/input* or with multiple control *parameters/inputs*. The single variable control parameter may be the curvature of the deformable *mirror*. In other *embodiments*, two or more control parameters may be used possibly (*but* not *necessarily*) including the curvature *parameter*.

In operation, the light from different fields enters a lens assembly 115, falls on the DM 110 (in its mth state) and is reflected from the DM 110 towards another lens assembly 120, passes through the lens assembly 120 and forms an image on an image sensor 118 lying in or near the focal plane 105. As shown, the processed light includes the light from center field 102, the light from mid-off-center field 103, and the light from far-off-center field 104. In some or all states, the light may be focused in the focal plane 105, where the image formed by the light may be captured by the image sensor 118. Each of the lens "assemblies" 115 and 120 may contain a single optical element or multiple optical elements.

Figure 2:
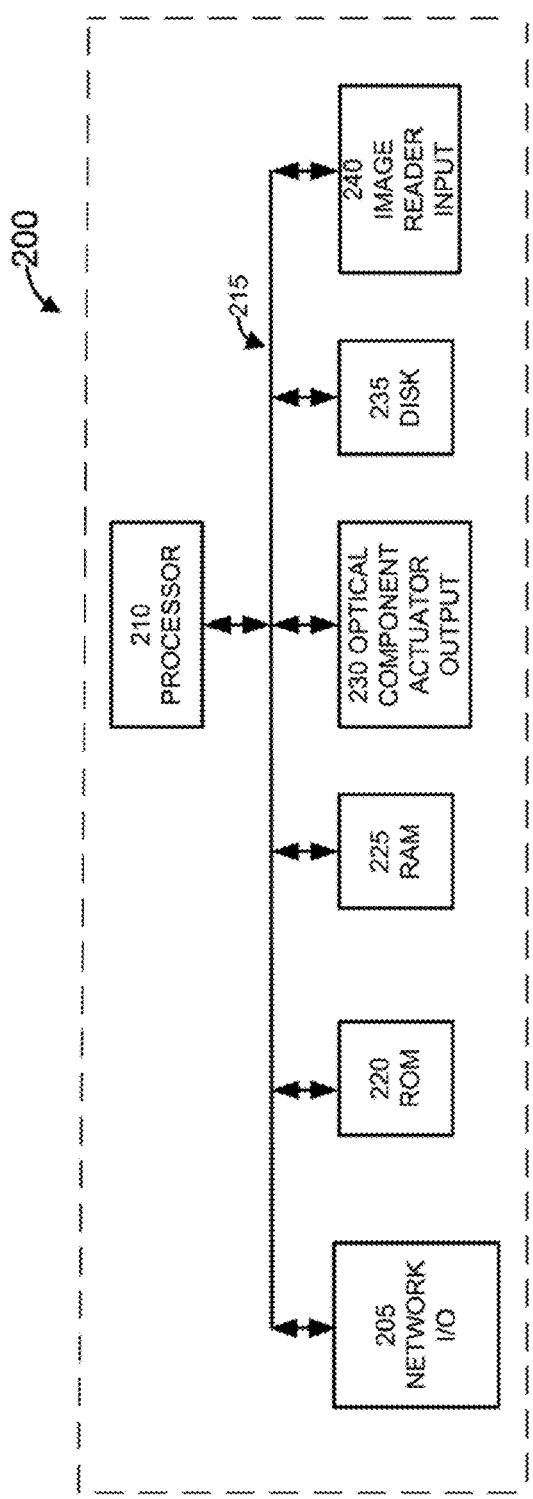
FIG. 2 illustrates selected components of a computer system that may be connected to and operate together with the optical system of FIG. 1.

FIG. 2 illustrates selected components of a computer system 200 that may be connected to the optical system 100 to capture images through the optical system 100 and to (re)construct an enhanced picture from the captured images. In particular, the processing logic of the computer system 200 may be configured to control the state of the deformable mirror 100 (or of another configurable optical component, or to vary the optical axis, to pan, to zoom, or otherwise to provide relative motion between the imager and the image of the object on the imager); the system 200 may further be configured to capture the images through the image sensor 118 in the focal plane 105. The different images may correspond to the multiple states of the deformable mirror 110 (or to multiple states of another configurable component, or to different axes, or to different relative positions of the imager and the image of the object in the scene on the imager). The computer system 200 may further be configured to process the captured images using computational imaging, creating an enhanced or improved picture of the imaged object/scene.

In FIG. 2, a processor 210 is configured to perform computer-readable program code instructions to control the operation of the system 200 and to execute the method steps described throughout this document. The instructions may be stored in the processor 210 itself, in a read only memory ("ROM") 220, random access memory ("RAM") 225, in a magnetic (or optical, or other) disc storage 235, and/or elsewhere. Generally, the program code instructions may be embodied in machine-readable storage media, such as hard drives, floppy diskettes, compact disc ROMs ("CD-ROMs"), DVD ROMs ("Digital Versatile Disc-ROMs"), and similar devices that can store the instructions permanently or temporarily, in a non-transitory manner. The program code can also be transmitted over a transmission medium, for example, over electrical wiring or cabling, through optical fiber, wirelessly, or by any other form of physical transmission. The transmission can take place over a dedicated link between telecommunication devices, or through a wide- or local-area network, such as the Internet, an intranet, extranet, or any other kind of public or private network. In one embodiment, the program code is downloaded to the system 200 through a network interface 205.

The computer system 200 also includes an optical component actuator output 230, controlled by the processor 210 when the processor 210 executes the program code. This can be a physical actuator or an electrical output. The actuator output 230 may connect to the deformable mirror (or another configurable optical component, or to some means configured to vary the optical axis or the relative positions of the imager and the object in the scene), to put the optical imager in any one of a plurality of M states, as needed. The computer system 200 further includes an image reader input 240, configured to read the images from the image sensor 118 in the focal plane 105 of the optical system 100. The input 240 may be an electrical input connected to the output of the image sensor 118, or the image sensor 118 itself.

A bus 215 connects the different components of the computer system 200, enabling the processor 210 (1) to read from and write into the network I/O 205, the RAM 225, and the disk 235; (2) to read from the ROM 220, the disk 235, and the image reader input 240; and (3) to write into the optical component actuator output 230. The bus 215 may also enable the processor 210 (4) to write into the image reader input 240, for example, to configure the image sensor 118 and/or the input 240; (5) to read from the optical component actuator output 230, for example, to read the status of the output or the actuator connected to the output; and (6) to write into the ROM 220, for example, reprogramming the ROM 220 with new code.

As a person skilled in the art would readily understand after perusal of this document, the boundaries of some or all of the various blocks, including the systems 100 and 200, are shown for convenience of description only, and certain elements and/or functions may be logically related to multiple blocks and may be shown as belonging to more than one block.

A display device may be connected to or be a part of the computer system 200 to display the captured images, the processed (CI-enhanced) picture, and/or other information.

The computer system 200 may configure and operate the optical system 100 to (re)construct a relatively high-resolution image from a sequence of M captured images; each of the captured images is acquired with the optical system 100 possessing a known optical transfer function in its different state m. (This, however, does not exclude the possibility of using two or more images captured in the same state of the optical system 100, although some images are captured in the different states of the system.) Taken individually, each of the images captured in the different states represents a substantially filtered version of the object field, with some object information irreversibly lost due to destructive interference within the optical system 100. With an appropriate post-detection signal processing, however, an estimate (i.e., a computationally-enhanced picture/image) based on the image sequence can provide a relatively higher spatial resolution than that represented by any individual captured image.

The signal processing can take place in the spatial frequency domain. For each field position and configuration, there is an a-priori known filter, indicated below by coefficients $A_m$ or $B_m$, which multiplies the spatial domain Fourier transform ("FT") of the mth image, denoted by $I_m$.

There are several architectures (processing schemes) that can be used to process a plurality of captured images, including a Moving Average ("MA") architecture, and a Recursive or Auto-Regressive ("AR") architecture.

In accordance with the Moving Average scheme, M filtered FTs (Fourier transformed captured images) are summed together, and then inverse-Fourier-transformed to yield the reconstructed image with the minimum mean-square error. Selected aspects of this scheme are illustrated as a process 300 in FIG. 3.

For the Moving Average scheme, the $A_m$ weighting coefficients are computed from the following formula:

$$A_m = \frac{R_m^*}{\frac{S_{noise}}{S_{obj}} + \sum_{m=1}^{M} |R_m|^2},$$

where $R_m$ represents the complex optical transfer function of the optical system for the mth configuration, $R_m^*$ is the complex conjugate of $R_m$, and $S_{Noise}$ and $S_{Obj}$ are respectively the average power spectral densities of the noise and noise-free projection of the object. Each quantity expressed in the formula is spatial-frequency dependent. One or more of the zeroes of the optical transfer functions $R_m$ are shifted with respect to each other as the state of the system varies. In other words, one or more of the zeroes (or minima below a detectable limit) of $R_m$ vary with the index subscript m. In some variants, each zero of a plurality of zeroes varies from one index subscript to the next; in some variants, two or more, but not all, the zeroes of the plurality of zeroes vary from one index subscript to the next; and in some embodiments, only a single zero varies.

In accordance with the Auto-Regressive scheme, the Fourier Transform of the reconstructed image is continually updated (at least for a period of time including multiple updates) with a filtered version of the last detected image, with the corresponding known OTF. Selected aspects of this scheme are illustrated as a process 400 in FIG. 4.

For the Auto-Regressive scheme, the $B_m$ weighting coefficients are computed from the following formula:

$$B_m = \frac{R_m^*}{\frac{S_{noise}}{S_{obj}} + |R_m|^2},$$

where $R_m$ once again represents the complex optical transfer function of the optical system for the mth configuration, $R_m^*$ is the complex conjugate of $R_m$, and $S_{Noise}$, and $S_{Obj}$ are respectively the average power spectral densities of the noise and noise-free projection of the object. The constant η is predetermined, less than 1 and greater than 0; it may be set a-priori, although its optimal value may depend on in a complicated way on the SNR; for example, this constant may be set approximately to 0.1, 0.2, 0.3, 0.4, 0.5, 0.6, 0.7, 0.8, or 0.9.

Each quantity expressed in the formula is spatial-frequency dependent. One or more of the zeroes of the optical transfer functions $R_m$ are shifted with respect to each other as the state of the system varies. In other words, one or more of the zeroes (minima below a detectable limit) of $R_m$ vary with the index subscript nm. In some variants, each zero of a plurality of zeroes varies from one index subscript to the next; in some variants, two or more, but not all, the zeroes of the plurality of zeroes vary from one index subscript to the next; and in some embodiments, only a single zero varies.

Either of these architectures (the MA and the AR) can be made adaptive to degradations caused by various sources (e.g., atmospheric turbulence or blur caused by motion), by introducing a mechanism that instantaneously measures the point-spread-function ("PSF") of the optical system, then using the resulting R (Fourier transform) coefficients in the associated equations. The PSF can be obtained using similar (guide star) techniques used in adaptive optics for astronomical telescopes. Adaptive optics works by measuring the distortions in a wavefront and compensating for them with a device that corrects those errors, such as a deformable mirror or a liquid crystal array. See, for example, the Wikipedia Adaptive Optics article (as of Dec. 1, 2012), and the sources cited therein, which sources include:

Beckers, J. M., Adaptive Optics for Astronomy: Principles. Performance, and Applications, Annual Review of Astronomy and Astrophysics (1993) 31 (1): 13-62. Bibcode 1993ARA&A . . . 31 . . . 13B. doi:10.1146/annurev.aa.31.090193.000305;

Roorda, A and Williams, Retinal imaging using adaptive optics (2001), in MacRae, S; Krueger, R; Applegate, R A. Customized Corneal Ablation: The Quest for SuperVision. SLACK, Inc. pp. 11-32. ISBN 1556426259;

Watson, Jim, Tip-Tilt Correction for Astronomical Telescopes using Adaptive Control, Wescon—Integrated Circuit Expo 1997;

Max, Claire, Introduction to Adaptive Optics and its History, American Astronomical Society 197th Meeting;

GRAAL on a Quest to Improve HAWK-I's Vision, ESO Picture of the Week as retrieved Nov. 18, 2011;

Optix Technologies Introduces AO-Based FSO Communications Product, June 2005, which article was available on the website of the adaptiveoptics.org on Jun. 28, 2010;

Retinal OCT Imaging System to Incorporate Adaptive Optics, April 10, 2006, which article was available on the website of the adaptiveoptics.org on Jun. 28, 2010; and PixelOptics to Develop SuperVision for U.S. Military; $3.5 Million in Funding Provided ASDNews, ASDNews, as retrieved Jun. 28, 2010.

Each of the above publications (including the Wikipedia article and the sources cited therein and listed above) is expressly incorporated by reference in its entirety, as if fully set forth herein.

The PSF may be used to post-process the captured images, rather than driving the configurable component (e.g., the DM), to create the narrowest PSF in real time.

The MA and AR techniques described above represent generalizations of the Wiener filter concept, which can be viewed as the limiting case when M=1. Wiener or least mean square filtering is described, for example, in chapter 5 of Digital Image Processing, by Rafael Gonzalez and Richard Woods, $2^{nd}$ ed., 2002, which book is hereby incorporated by reference in its entirety, as if fully set forth herein. When only a single captured image is used, the existence of zeroes in the OTF, or equivalently, in the magnitude of the OTF (which is the modulation transfer function, MTF), results in information missing from the image of the original object, because of destructive interference within the optical system. With multiple captured images, the OTF zeroes may move and the information missing in one captured image may be obtained from another image captured with a different deformable mirror configuration (or with another state of a configurable optical component or means for creating perceived motion of the imaged object relative to the focal image plane). Using the DM or other means for changing configuration, the optical system can be quickly and easily reconfigured to yield a different response, such that the region of overlap of the zeroes in the MTF for any two configurations is reduced, as compared to the region of the zeroes in any one individual configuration. Probability of overlapping zeroes goes down with increasing the number of states, M.

Figure 5:
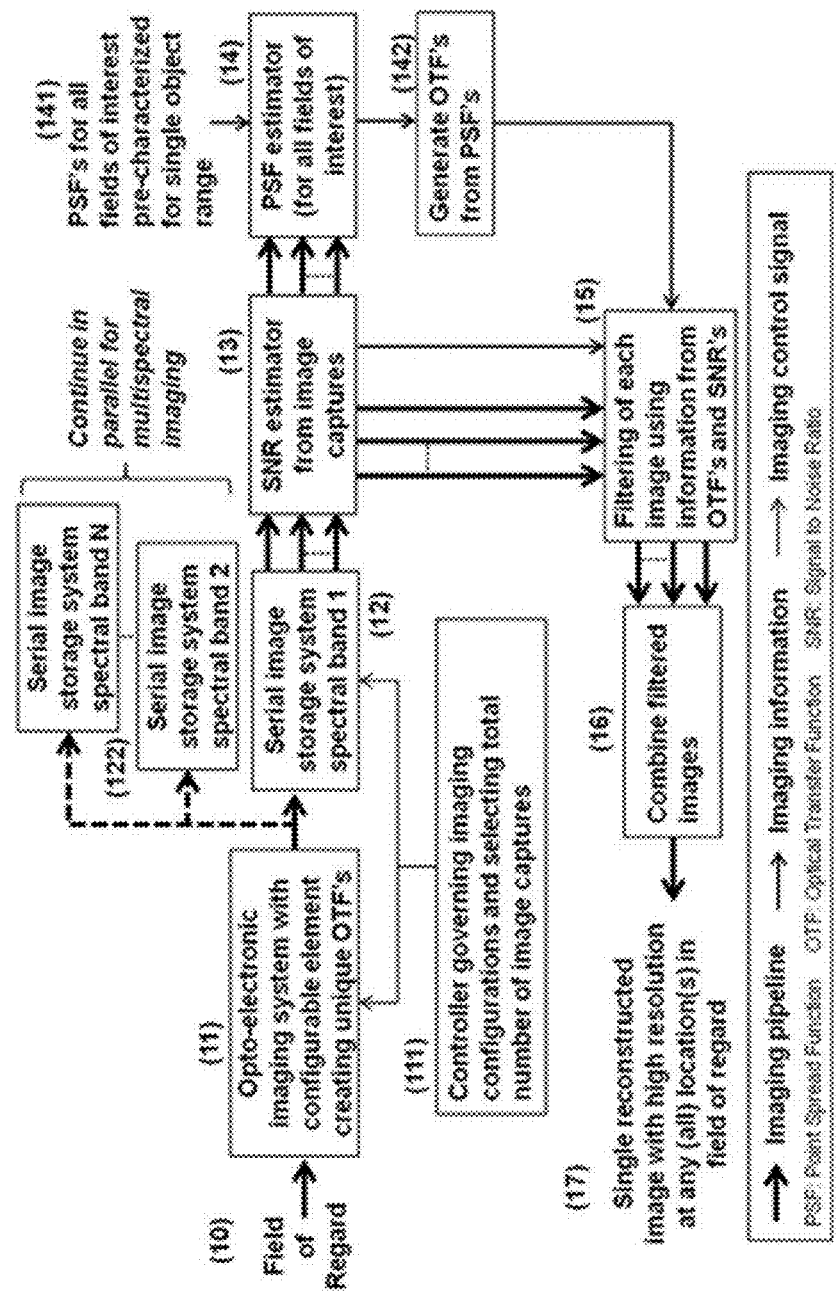
FIG. 5 illustrates selected features of computational imaging with configurable element(s)

FIG. 5 illustrates selected features of exemplary embodiments of computational imaging systems with configurable element(s). Field-of-regard 10 is imaged by an opto-electronic imaging system 11 (such as the optical system 100 described above). The imaging system 11 is configured by a computer controller 111 (such as the system 200, which is also described above) to a first configuration by adjusting the configurable element (or elements, as the case may be). The image is captured in a spectral band 1 and sent to an image storage system 12. If the imaging system 11 is multispectral, as is the case in some variants, the image storage system 12 may be extended into a plurality of image storage systems 122, isolating the images captured in each spectral band for further processing. The multiple image storage systems 12/122 may be combined into a single image storage system, even where multiple bands are used. If desired, the computer controller 111 sets the imaging system 11 to a second configuration. This second configuration is such as to generate an optical transfer function that is different from the OTF in the first configuration (i.e., different in at least one of the bands, and possibly in two or more bands). Again, the image is stored in the system(s) 12/122. The acquisition and storage process may continue in additional configurations with distinct OTFs, until the desired number of image captures is reached. Each image capture may be created using a unique state or configuration of the imaging system 11. The computational imaging process is performed on the captured images stored in the image storage system(s) 12 and/or 122. In the case of multispectral imaging, the subsequent computational processing may be performed in parallel in the different bands, and independently optimized by spectral band.

Because the core process may be common to all bands, the following description will continue for the spectral band 1, with the understanding that identical or analogous steps may be performed for additional spectral bands. The series of stored image captures is processed in an SNR estimator 13, to estimate signal-to-noise ratios in all or selected fields of interest within the images. To reduce processing requirements, the SNR may be predefined for each field of interest and held fixed. The point spread functions for all or selected fields of interest may be subsequently estimated in a PSF estimator 14 for the series of image captures. The PSF estimator 14 may be seeded by field-dependent PSF's stored in a memory or other storage device 141, such as the elements 220, 225, and 235 of the system 200. The field-dependent PSFs in the device 141 may be pre-characterized for the imaging configurations of the imaging system 11. If needed, the PSF's can be digitally propagated to the appropriate object range in a given field. Alternatively, scene information from the image captures can be utilized to estimate the PSF's in the PSF estimator 14. An OTF generator 142 transforms the estimated PSF's into estimates of the complex, field-dependent OTF's. The OTF's are provided to a digital filter 15. The filter 15 may also make use of the estimated SNR values. In an extension of Wiener filtering, the filter 15 may uniquely modify each image in the series of image captures using the SNR and OTF values. The filter process may be performed independently for all fields of interest. After the image series has been filtered, the images are combined using a combiner 16, to produce one or more enhanced images at an output 17.

Figure 6:
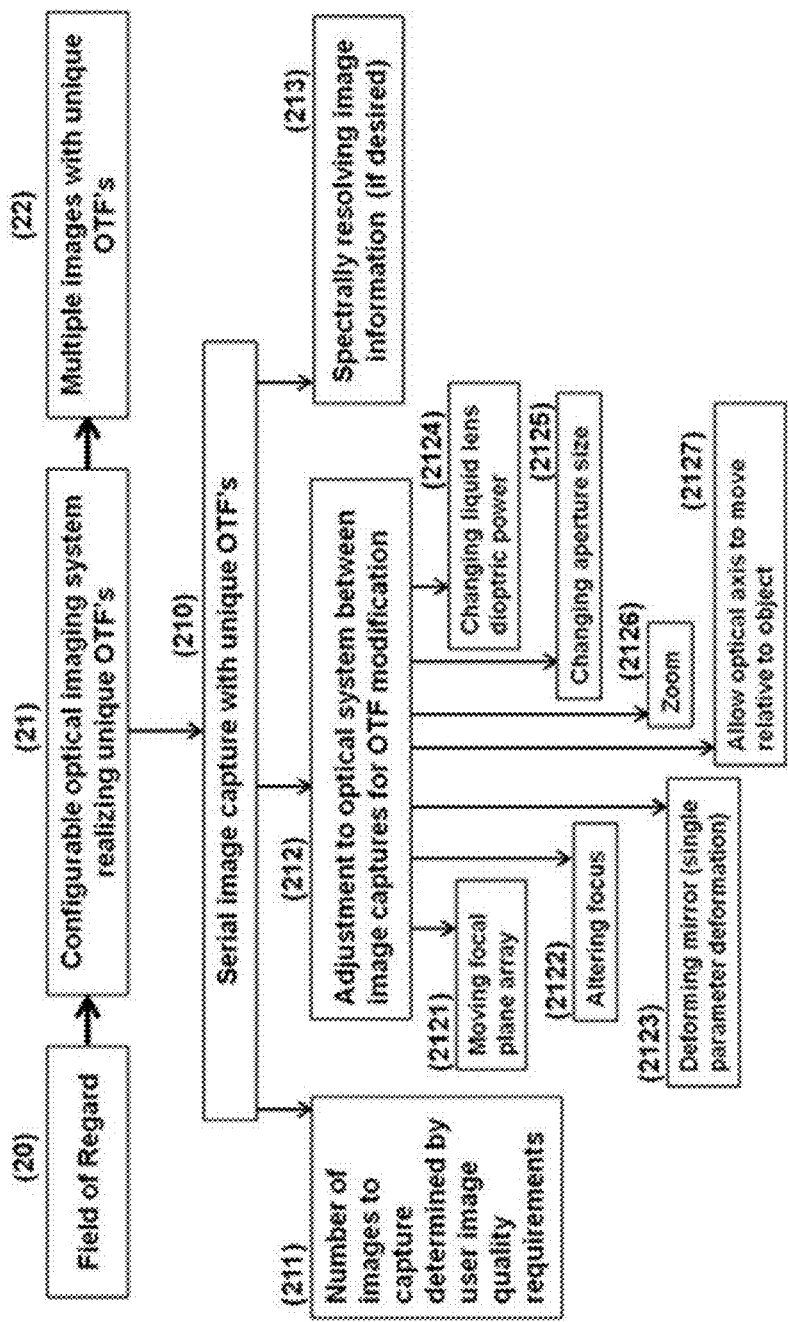
FIG. 6 illustrates selected features of a process for obtaining a plurality of images of a field-of-regard.

FIG. 6 illustrates selected steps and features of an exemplary process embodiment for obtaining a plurality of images of a field-of-regard, to be combined into a processed image in accordance with selected principles described in this document. This Figure shows one or more of the steps in progressive detail.

In step 20, an image of the field-of-regard is made available to the optical imaging system. For example, the optical imaging system may be deployed and pointed in a desirable direction.

In step 21, the optical imaging system captures a plurality of images. As expanded in block 210, and described throughout this document, each of the images may be captured using a different and distinct OTF, such as an OTF with different zeroes. Again, this does not prevent the capture of two or more of the images using the same OTF, but the OTFs differ for at least some of the images.

Drilling down further, at substep 211 the system may determine the number of images to be captured based on the user image quality requirements. This number may refer to the number of images captured with different OTFs. At substep 212, the optical imaging system is adjusted from one image capture to the next, so that the OTF can change between the captured images. At substep 213, the optical imaging system spectrally resolves image information. For example, the system captures and records the image information in different spectral bands of interest, such as the visible and infrared bands.

At the next level of detail, substeps 2121 through 2127 illustrate selected ways for reconfiguring the system to realize different OTFs. In substep 2121, the focal plane array is moved, for example, by moving the optical sensor (such as a CCD) relative to the optics of the optical imaging system.

As shown in substep 2122, the focus of the system may be altered, for example, by moving the optics (such as the lens assemblies 115 and/or 120) relative to the sensor (such as the image sensor 118), and/or by moving elements of the optics (such as the elements of the lens assembly 115 and/or the elements of the lens assembly 120) relative to each other.

As shown in substep 2123, input(s) of a deformable mirror may be driven by one or more changed control parameters.

As shown in substep 2124, dioptric power of a liquid lens can be changed. A typical liquid lens may include a pair of transparent, elastic membranes, with fluid in between the membranes. The membranes may be circular, sealed together at the edges, and installed in a housing. The clear aperture of the fluid and membranes, with index of refraction greater than 1, forms a lens. Piezoelectric actuators may control the pressure of the sealed fluid, causing the membranes to deflect and become more or less convex, for example. Changing the membranes' shapes may directly change the lens's dioptric power (i.e., focal length). Liquid lenses may be available from LensVector, Inc., 2307 Leghorn Street, Mountain View, Calif. 94043, (650) 618-0707.

As shown in substep 2125, the aperture size of the optical imaging system can be adjusted, for example, by controlling an iris diaphragm.

As shown in substep 2126, the zoom or magnification of a lens of the optical imaging system may be varied.

As shown in substep 2127, the optical axis of the optical imaging system may be moved, for example, by moving the optical imaging system relative to the field-of-regard, or waiting until an object of interest in the field-of-regard moves relative to the system. Movement of the optical axis relative to the object allows achieving diverse OTFs with small or no optical system reconfiguration, making use of the unique OTFs associated with each individual field across the imager's field-of-regard. Provided some relative motion between the imager and scene, the imager can capture two, three, or more images in a series as the object in the scene traverses the field-of-regard. A given object in the scene may thus be imaged with a unique OTF at each field. The goal of imaging with diverse OTFs can be simultaneously achieved for all objects of interest. Relative motion between the scene/object and the imager can be accomplished, for example, by object motion, imager motion, and/or imager panning (rotation). For example, the detector array (such as a CCD) may be moved by a servomechanism controlled by the computer system.

Liquid crystal-based spatial light modulators may also be used for adjusting the optical system between image captures. The modulators may be obtained from various sources, for example. Meadowlark Optics. The liquid crystal-based spatial light modulators may be electronically adjustable, facilitating control by the computer system.

These and other reconfiguring steps may be employed individually or in combination of two or more such steps.

In step 22, the multiple images obtained in the step 21 may be stored and/or transmitted to and received by a processing portion of the system.

Figure 7:
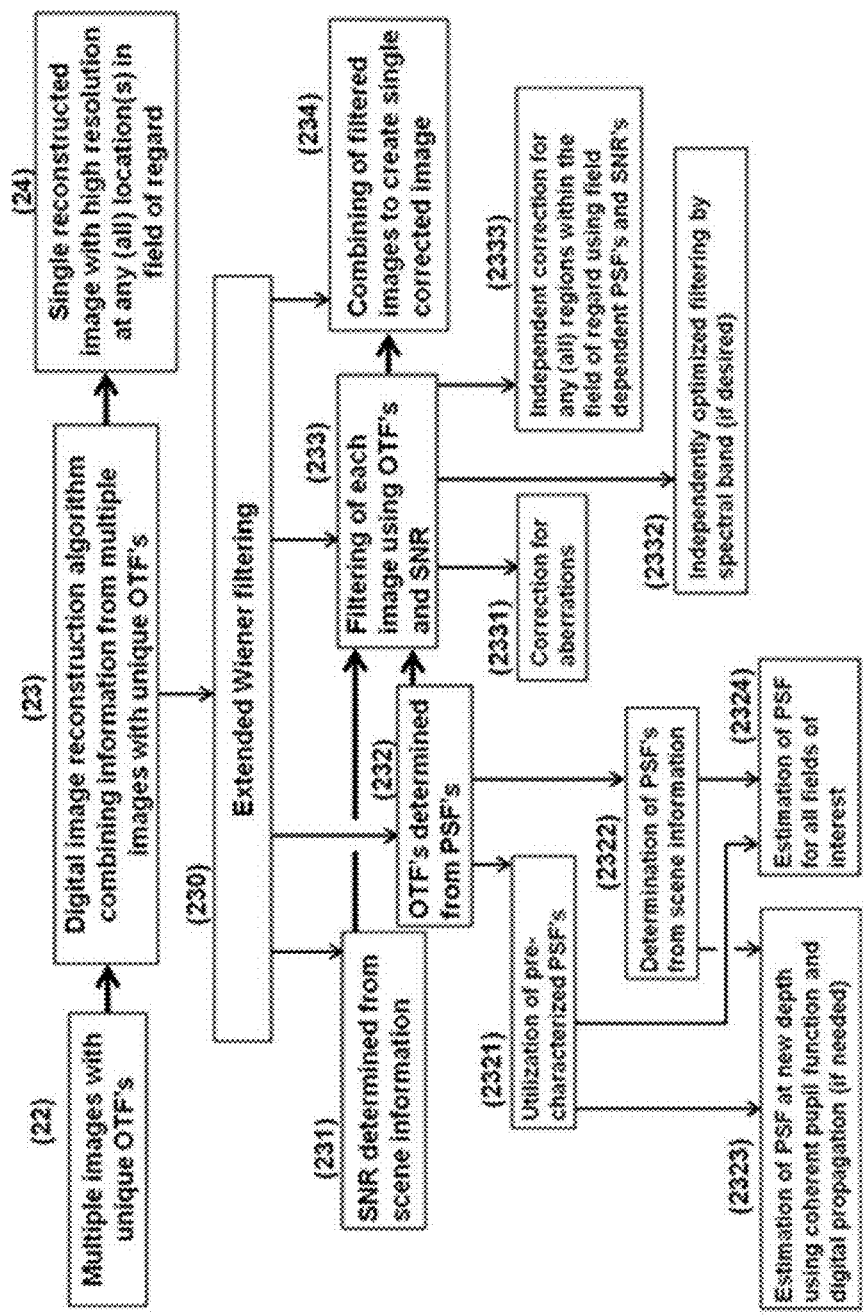
FIG. 7 illustrates selected features of a process for combining a plurality of images into an enhanced image.

FIG. 7 illustrates selected steps and features of an exemplary process embodiment for processing the plurality of images of the field-of-regard, combining them into a processed image in accordance with selected principles described in this document. This Figure also shows one or more of the steps in progressive detail.

The step 22 in this Figure is also shown in the previous Figure and described in connection with the previous Figure. The multiple images may thus be received by a processing portion of the system.

In step 23, the image reconstruction algorithm combines the information from the multiple images into an improved or reconstructed image of the field-of-view. The reconstructed image may then be stored and/or outputted by the optical imaging system, in step 24.

The step 23 may include extended Wiener filtering, in substep 230 and the substeps shown under the substep 230. The MA and AR approaches to performing this filtering have already been illustrated in FIGS. 3 and 4, and described in connection with those Figures.

Figure 3:
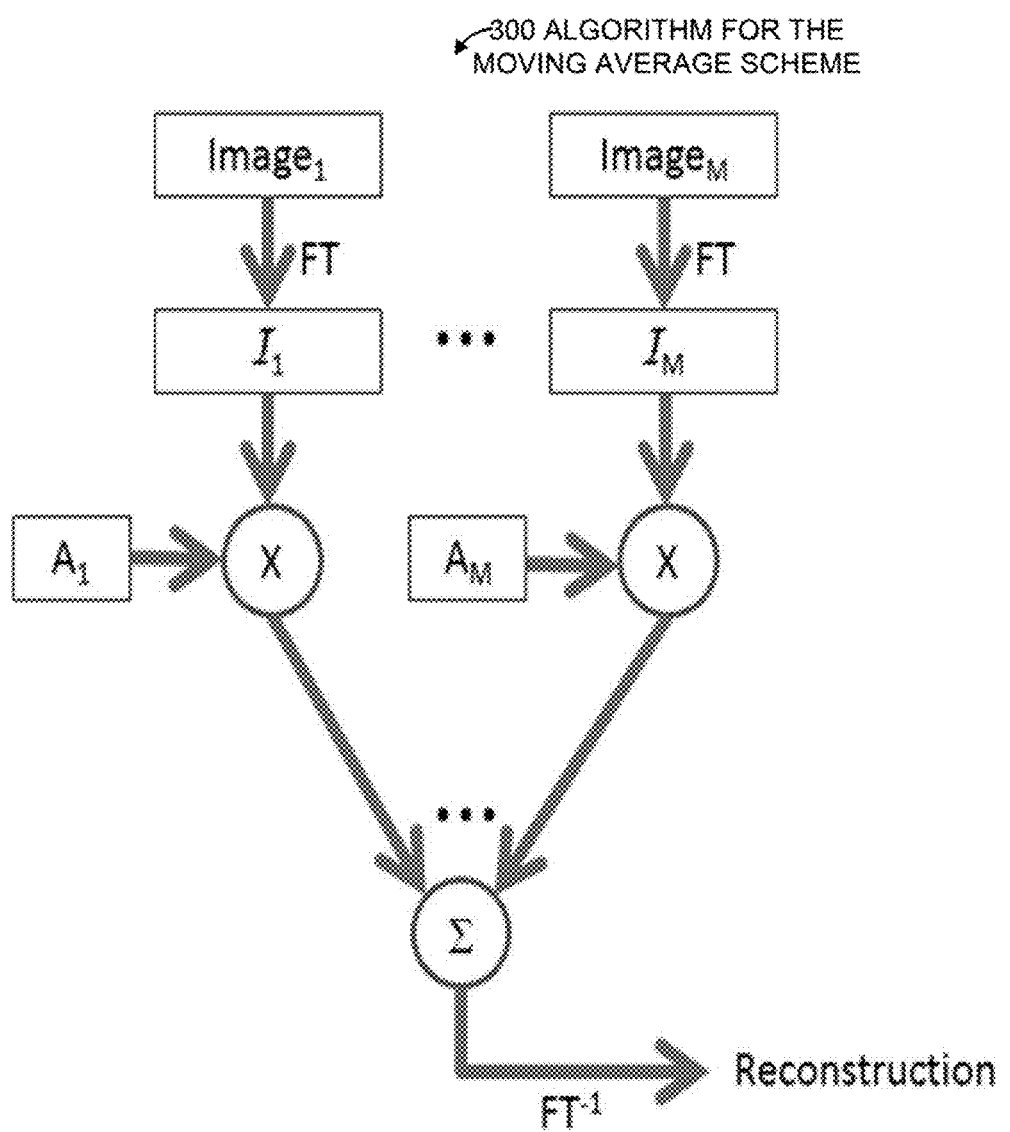
FIG. 3 illustrates selected aspects of a Moving Average processing scheme.
Figure 4:
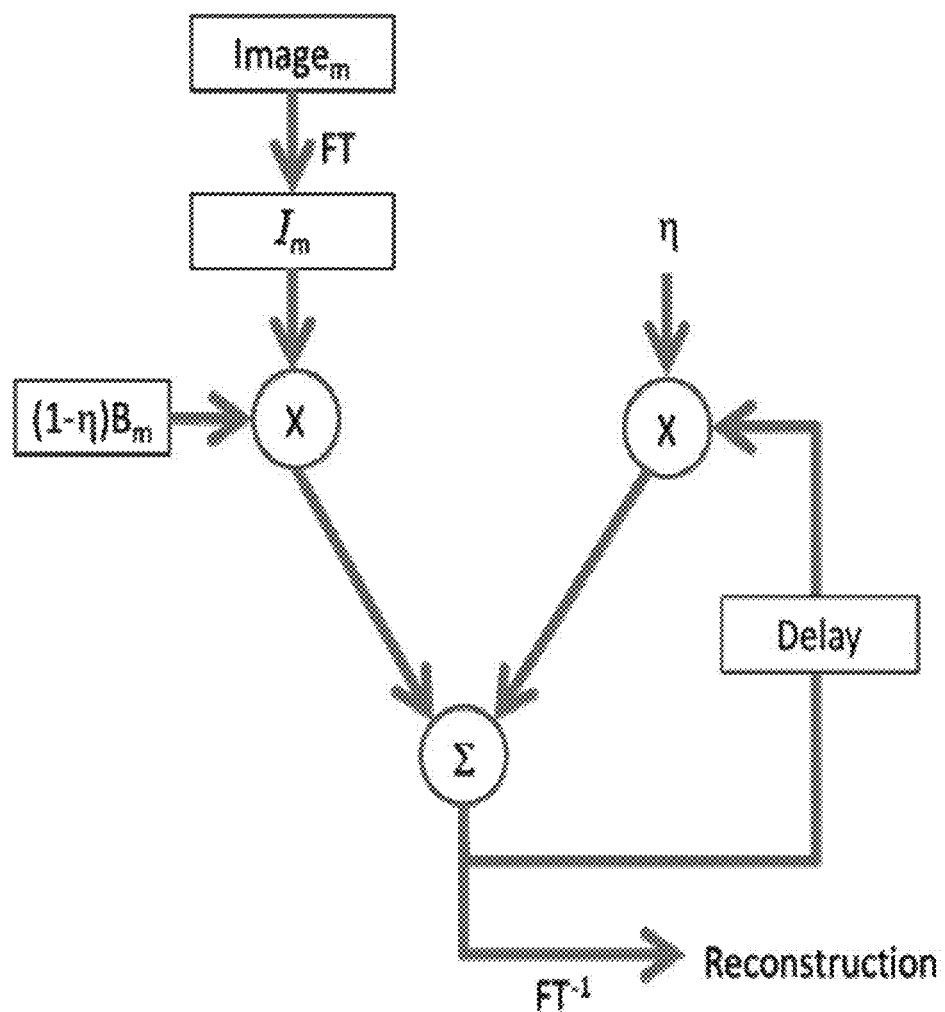
FIG. 4 illustrates selected aspects of an Auto-Regressive processing scheme.

Drilling further down under the substep 230, the SNR determined in substep 231 may be the same as the $S_{noise}/S_{obj}$ ratio shown in the formulas described in connection with the FIGS. 3 and 4. The OTFs needed for extended Wiener filtering may be obtained through Fourier transform of the point spread functions, in substep 232. For example, the PSFs may be obtained in substep 2321 through pre-characterization: in other words, the imaging system may have its PSF well estimated from a characterized design and realization, or the PSF may be measured at the time of assembly or after the imager is in situ, stored in a storage device (such as a memory or disk device), and retrieved when needed. As another example, the PSFs may be estimated from scene information, in substep 2322, by using known bright sources/features in a scene to be imaged. The utility of PSFs obtained for a given object distance (i.e., depth) can be extended by calculating the PSF at new object depths (substep 2323) using knowledge of the coherent pupil function and digital propagation. To support wide field-of-view imaging, in substep 2324, the PSFs may be pre-characterized (2321) or estimated (2322) for some or all fields of interest within the field-of-view, and in some or all bands of interest.

Continuing with details under the step 23, in substep 233 each of the images may be corrected using the SNRs obtained in the substep 231 and the OTFs obtained in the substep 232. The substep 233 may include correction of aberrations (substep 2331), spectrum-based correction (substep 2332), and field-based correction (substep 2333). The knowledge of the PSFs (and OTFs) at all or some fields of interest is useful for the realization of image enhancement at the fields of interest, in substep 2333.

In step 24, the improved or enhanced image from the step 23 is outputted by the system, for example, stored, displayed to a user, and/or transmitted to a local or a remote destination.

Figure 8:
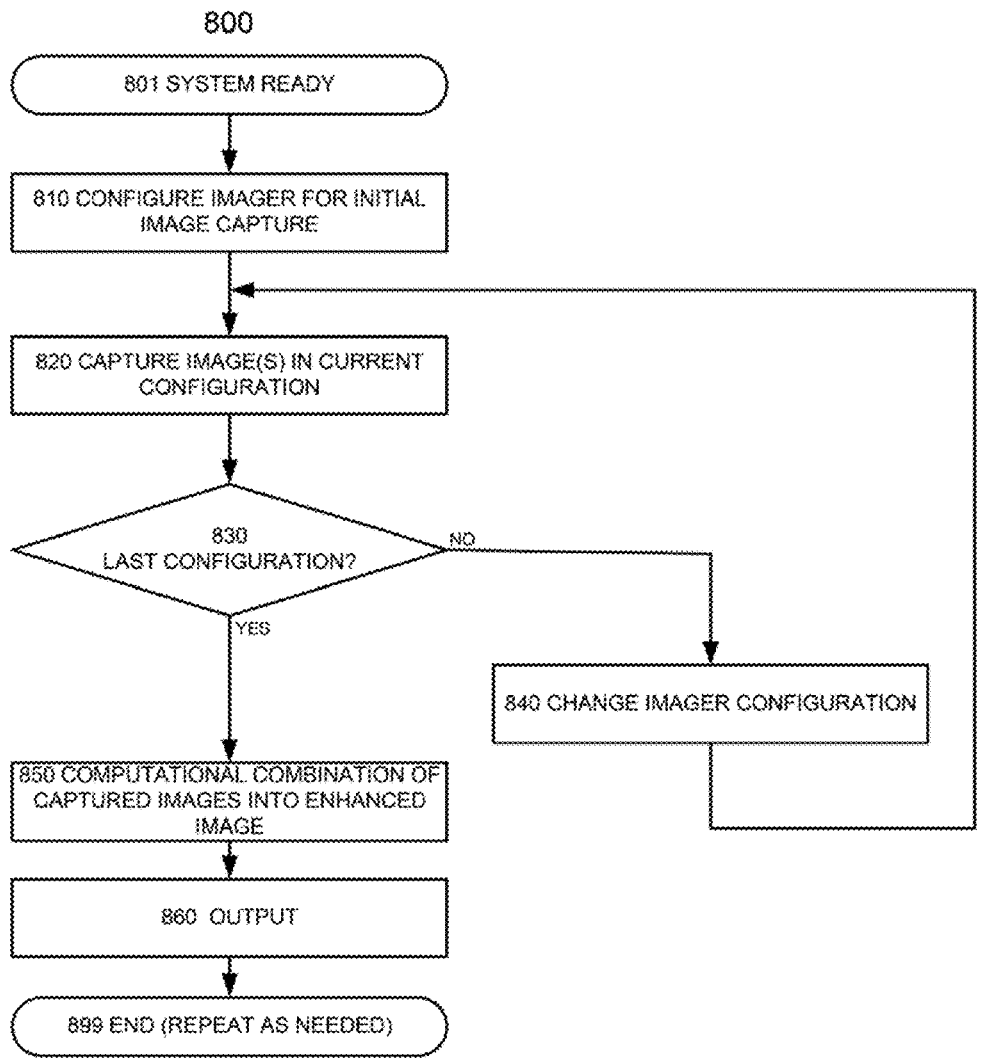
FIG. 8 illustrates selected steps and decision block of a computational imaging process, in accordance with selected aspects described in this document.

FIG. 8 illustrates selected steps of a CI process 800.

At flow point 801, the imager is powered up and ready. The imager may include a combination of an optical system such as the system 100 of FIG. 1, and a computer system such as the system 200 of FIG. 2.

In step 810, the imager is configured for capturing images in a first configuration. For example, the band of interest may be selected, and the configurable optical component of the imager may be put in a first state.

In step 820, one or more images may be captured with the imager in the first configuration. The captured images may be stored.

In decision block 830, the system determines whether the current imager configuration is the last configuration of a plurality of imager configurations. If images need to be captured in one or more additional configurations, process flow proceeds to step 840, where the imager configuration is changed. For example, the configurable optical component is put into a second (and different) state, to change one or more of the zeroes of the OTF, and/or the imager may be configured to operate in a different band.

After two or more passes through the steps 810/820/840 and the decision block 830, images have been captured in all the desired configurations, the process flow proceeds to step 850. Here, CI is employed to generate an enhanced image, for example, using the MA or AR approaches described in connection with FIGS. 3 and 4.

In step 860, the enhanced image from the step 850 is outputted, for example, stored, displayed, and/or transmitted.

The process then may end in flow point 899, to be repeated as needed.

Computational imaging described in this document does not require that the configurable optical component (e.g., the deformable mirror) be configured in different states to correct for the wavefront error in the captured image or a part of the image (e.g., the foveated part). But it also does not preclude selecting one or more of the states of the configurable optical component so that the wavefront error is reduced in one or more of the fields of the image. Thus, in some embodiments, the states of the DM or another optical components are in fact selected so that the wavefront error is reduced. In this way, computational imaging may be advantageously combined with the use of DM for wavefront error corrections and/or foveation.

An improved or even ideal (in a least-square error sense) construction of the enhanced image may be enabled by (1) the use of simple configurable components that change the OTF/PSF, configurable over a plurality of M states, (2) a-priori knowledge of the OTFs for the imager at a particular field/wavelength, and (3) subsequent computation using detected images, each with the optical system in a known configuration. Because of the ability of this technique effectively to fill-in the zeroes in the OTF normally associated with a static optical imaging system, a path is enabled toward recovering the information which may otherwise be irreversibly lost in a static optical system.

In selected embodiments, the recovery enables a significant reduction in size/weight/power for a given imager, because the traditional way of dealing with the presence of those MTF zeroes is to simply avoid them, often resulting in complex optical designs that are limited to a small fraction of a wavelength RMS wavefront error. In accordance with selected aspects described in this document, avoidance of MTF zeroes over a single configuration is replaced with the avoidance of zeroes over multiple configurations, which may allow the native performance of the optical imager (without the DM or another configurable optical component) to be poorer, while still having the potential to obtain enhanced images with high spatial resolution.

In selected embodiments, spectrally resolved image acquisition (213) combined with spectrally dependent post-processing (2332) may allow correction of the aberrations in multispectral imagers using common optical paths. The common optical path approach may be advantageous for man-portable multispectral imagers, because it may reduce system size, weight, and/or cost.

In selected embodiments, the estimation of PSFs for all fields of interest (2324) and the independent aberration correction for any or all fields of interest within the field-of-view (2333) may allow image correction in wide field-of-view imagers.

Although steps and decision blocks of various methods may have been described serially in this disclosure, some of these steps and decisions may be performed by separate elements in conjunction or in parallel, asynchronously or synchronously, in a pipelined manner, or otherwise. There is no particular requirement that the steps and decisions be performed in the same order in which this description lists them and the accompanying Figures show them, except where explicitly so indicated, otherwise made clear from the context, or inherently required. It should be noted, however, that in selected examples the steps and decisions are performed in the particular progressions described in this document and/or shown in the accompanying Figures. Furthermore, not every illustrated step and decision may be required in every system, while some steps and decisions that have not been specifically illustrated may be desirable or necessary in some embodiments.

As is known to those skilled in the art, data, instructions, signals, and symbols may be carried by voltages, currents, electromagnetic waves, other analogous means, and their combinations.

As is also known to those skilled in the art, blocks, modules, circuits, and steps described in this documents may be embodied as electronic hardware, software, firmware, or combinations of hardware, software, and firmware. Whether specific functionality is implemented as hardware, software, firmware or a combination, this description is intended to cover the functionality. Some illustrative blocks, modules, circuits, and analogous elements described in this document may be implemented with a general purpose processor, a special purpose processor (such as an application specific integrated circuit-based processor), a programmable/configurable logic device, discrete logic, other discrete electronic hardware components, or combinations of such elements. A general purpose processor may be, for example, a microcontroller or a microprocessor. A processor may also be implemented as a combination of computing devices, for example, a plurality of microprocessors, one or more microprocessors in conjunction with one or more microcontrollers and/or one or more digital signal processors, or as another analogous combination.

The instructions (machine executable code) corresponding to the method steps of this disclosure may be embodied directly in hardware, in software, in firmware, or in combinations thereof. A software module may be stored in volatile memory, flash memory, Read Only Memory ("ROM"), Electrically Programmable ROM ("EPROM"), Electrically Erasable Programmable ROM ("EEPROM"), hard disk, a CD-ROM, a DVD-ROM, or other form of non-transitory storage medium known in the art. An exemplary storage medium is coupled to the processor such that the processor can read information from, and write information to, the storage medium. In the alternative, the storage medium may be integral to the processor.

What is claimed is:

1. An imaging method, comprising:
    capturing a plurality of M captured images of an object through an optical system, the optical system comprising a configurable optical component, the configurable optical component being capable of being configured in a plurality of configurations, wherein each captured image of the plurality of M captured images is captured with the configurable optical component being in a different corresponding configuration of the plurality of configurations;
    transforming each captured image of the plurality of M captured images using a selected spatial transform to obtain a corresponding transformed captured image, thereby obtaining a plurality of M transformed captured images;
    weighting each transformed captured image of the plurality of M transformed captured images by a weighting coefficient $(1-\eta) \times B_m$ wherein $\eta$ is a predetermined constant less than 1 and greater than 0, and $B_m$ is computed using the formula $$B_m = \frac{R_m^*}{\frac{S_{noise}}{S_{obj}} + |R_m|^2},$$

wherein $R_m$ is the optical transfer function of the optical system in the configuration corresponding to said each captured image of the plurality of M captured images from which said each transformed captured image of the plurality of M transformed captured images was obtained, $R^*_m$ is the complex conjugate of $R_m$, $S_{Noise}$ is the average power spectral density of the noise projection of the object, and $S_{Obj}$ is the average power spectral density of the noise-free projection of the object, thereby obtaining a weighted image corresponding to said each transformed captured image of the plurality of M transformed captured images, thereby obtaining a plurality of M weighted images;
    initializing a summed transformed image;
    after the step of initializing,
    in response to obtaining each weighted image of the plurality of M weighted images, modifying the summed transformed image by first multiplying the summed transformed image by $\eta$ and then adding to the summed transformed image said each weighted image of the plurality of M weighted images;
    inverse transforming the summed transformed image using inverse transform of the selected spatial transform to obtain a processed image; and
    outputting the processed image, the step of outputting comprising storing the processed image, displaying the processed image, or transmitting the processed image.

2. The imaging method of claim 1, wherein the selected spatial transform is a spatial Fourier Transform, and the inverse transform is an inverse spatial Fourier Transform.

3. The imaging method of claim 2, wherein the configurable optical component comprises a deformable mirror and the method further comprises configuring the deformable mirror in the plurality of different configurations using one or more control parameters of the deformable mirror.

4. The imaging method of claim 2, wherein:
    the configurable optical component is a deformable mirror;
    each of the steps of capturing, transforming, weighting, summing, and inverse transforming is performed at least in part by at least one processor of at least one computer system; and
    one or more zeroes of the optical transfer function of the optical system differ for at least two configurations of the plurality of different configurations corresponding to at least two images of the plurality of M captured images.

5. The imaging method according to claim 1, further comprising configuring the configurable optical component in at least two configurations of the plurality of configurations.

6. The imaging method according to claim 5, wherein the step of configuring the configurable optical component comprises causing the optical system to wait for the object to move to a different field of the optical system.

7. The imaging method according to claim 5, wherein the step of configuring the configurable optical component causes at least one change in an optical axis of the optical system.

8. The imaging method according to claim 5, wherein the step of configuring the configurable optical component comprises providing relative motion between the configurable optical component and the object.

9. The imaging method according to claim 5, wherein the step of configuring the configurable optical component comprises changing at least one control parameter of a deformable mirror of the optical system.

10. The imaging method according to claim 5, wherein the step of configuring the configurable optical component comprises moving a focal plane array of the optical system.

11. The imaging method according to claim 5, wherein the step of configuring the configurable optical component effects at least one alteration in focus of the optical system.

12. The imaging method according to claim 5, wherein the step of configuring the configurable optical component comprises changing dioptric power of a lens of the optical system.

13. The imaging method according to claim 5, wherein the step of configuring the configurable optical component effects at least one change in size of an aperture of the optical system.

14. The imaging method according to claim 5, wherein the step of configuring the configurable optical component causes at least one change in zoom setting of the optical system.

15. The imaging method according to claim 5, wherein the step of configuring the configurable optical component comprises panning the optical system.

16. The imaging method according to claim 5, further comprising performing field correction of the plurality of M captured images.

17. The imaging method according to claim 5, further comprising performing spectral band correction of the plurality of M captured images.

18. An apparatus for processing images, the apparatus comprising:
an optical system comprising a configurable optical component, the configurable optical component being capable of being configured in a plurality of different configurations;
a storage device storing program code instructions; and
at least one processor, wherein the at least one processor is coupled to the optical system to enable the at least one processor to control configuration of the configurable optical component and to capture images in a focal plane of the optical system, and wherein the at least one processor is configured to execute the program code instructions to cause the apparatus to perform steps comprising:
capturing a plurality of M captured images of an object through the optical system, wherein each captured image of the plurality of M captured images is captured with the configurable optical component being in a different corresponding configuration of the plurality of configurations;
transforming each captured image of the plurality of M captured images using a selected spatial transform to obtain a corresponding transformed captured image, thereby obtaining a plurality of M transformed captured images;
weighting each transformed captured image of the plurality of M transformed captured images by a weighting coefficient $(1-\eta) \times B_m$ wherein $\eta$ is a predetermined constant less than 1 and greater than 0, and $B_m$ is computed using the formula $$B_m = \frac{R_m^*}{\frac{S_{noise}}{S_{obj}} + |R_m|^2},$$

wherein $R_m$ is the optical transfer function of the optical system in the configuration corresponding to said each captured image of the plurality of M captured images from which said each transformed captured image of the plurality of M transformed captured images was obtained, $R^*_m$ is the complex conjugate of $R_m$, $S_{Noise}$ is the average power spectral density of the noise projection of the object, and $S_{Obj}$ is the average power spectral density of the noise-free projection of the object, resulting in a weighted image corresponding to said each transformed captured image of the plurality of M transformed captured images, thereby obtaining a plurality of M weighted images;
initializing a summed transformed image;
after the step of initializing,
in response to obtaining each weighted image of the plurality of M weighted images, modifying the summed transformed image by first multiplying the summed transformed image by $\eta$ and then adding to the summed transformed image said each weighted image;
inverse transforming the summed transformed image using inverse transform of the selected spatial transform to obtain a processed image; and
outputting the processed image, the step of outputting comprising storing the processed image, displaying the processed image, or transmitting the processed image.

19. The apparatus of claim 18, wherein the selected spatial transform is a spatial Fourier Transform, and the inverse transform is an inverse spatial Fourier Transform.

20. The apparatus of claim 19, wherein the configurable optical component comprises a deformable mirror configurable in the plurality of different configurations using at least one control parameter of the deformable mirror.

21. The apparatus of claim 19, wherein:
the configurable optical component comprises a deformable mirror; and
one or more zeroes of the optical transfer function of the optical system differ for at least two configurations of the plurality of different configurations corresponding to at least two images of the plurality of M captured images.

22. The apparatus according to claim 21, wherein the configurable optical component comprises a variable aperture, and the at least one processor is configured to execute the program code instructions to change size of the variable aperture of the optical system from image to image.

23. The apparatus according to claim 21, wherein the at least one processor is further configured to execute the program code instructions to perform field-based correction of the plurality of M captured images.

24. The apparatus according to claim 21, wherein the at least one processor is further configured to execute the program code instructions to perform spectral band correction of the plurality of M captured images.

25. The imaging apparatus according to claim 21, wherein the configurable optical component comprises a configurable liquid-crystal based spatial light modulator.

26. The apparatus according to claim 21, wherein the configurable optical component comprises a configurable liquid lens.

27. The apparatus according to claim 21, wherein the configurable optical component comprises a movable detector array.

* * * * *